(12) United States Patent
Ormont et al.

(10) Patent No.: US 10,990,568 B2
(45) Date of Patent: Apr. 27, 2021

(54) MACHINE LEARNING FOR AUTOMATED MODEL GENERATION WITH CONSTRAINTS

(71) Applicant: MICROSOFT TECHNOLOGY LICENSING, LLC, Redmond, WA (US)

(72) Inventors: Justin Ormont, Mountain View, CA (US); Yunling Wang, Redmond, WA (US); Aidan C Crook, Los Altos, CA (US); Sarthak Shah, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 622 days.

(21) Appl. No.: 15/688,739

(22) Filed: Aug. 28, 2017

(65) Prior Publication Data
US 2019/0018866 A1 Jan. 17, 2019

Related U.S. Application Data

(60) Provisional application No. 62/533,432, filed on Jul. 17, 2017.

(51) Int. Cl.
*G06F 16/28* (2019.01)
*G06F 16/21* (2019.01)
(Continued)

(52) U.S. Cl.
CPC .............. *G06F 16/212* (2019.01); *G06F 9/38* (2013.01); *G06F 9/3897* (2013.01); *G06F 16/211* (2019.01); *G06F 16/2425* (2019.01); *G06F 16/2471* (2019.01); *G06F 16/24575* (2019.01); *G06F 16/288* (2019.01); *G06N 5/003* (2013.01); *G06N 20/00* (2019.01); *G06N 20/20* (2019.01)

(58) Field of Classification Search
CPC ............... G06F 16/212; G06F 16/2471; G06F 16/2425; G06F 16/211; G06F 16/24575; G06F 16/21–212; G06F 16/28–288
USPC .......................................................... 707/769
See application file for complete search history.

(56) References Cited

U.S. PATENT DOCUMENTS 9,465,857 B1 * 10/2016 DeLand ................ G06F 16/283
2008/0256341 A1 * 10/2008 Weisberg .............. G06F 9/5055
712/220

(Continued)

OTHER PUBLICATIONS

"Non-Final Office Action Issued in U.S. Appl. No. 15/688,757", dated Nov. 29, 2019, 14 Pages.

*Primary Examiner* — Robert W Beausoliel, Jr.
*Assistant Examiner* — Nirav K Khakhar
(74) *Attorney, Agent, or Firm* — International IP Law Group, PLLC

(57) ABSTRACT

Systems and methods of automated machine learning for modeling a data set according to a modeling intent are presented. A modeling service receives a data set from a submitting party as well as a set of constraints. A pipeline generator generates a set of pipelines according to a modeling intent of a data set and in view of the set of constraints. A machine learned trained judge conducts an analysis of the pipelines to identify an optimal pipeline to train. Optimal results are generated according to the optimal pipeline and the optimal results are provided to the submitting party in response to receiving the data set and constraints.

20 Claims, 5 Drawing Sheets

(51) Int. Cl.
*G06F 9/38* (2018.01)
*G06N 20/00* (2019.01)
*G06F 16/2458* (2019.01)
*G06N 5/00* (2006.01)
*G06N 20/20* (2019.01)
*G06F 16/242* (2019.01)
*G06F 16/2457* (2019.01)

(56) References Cited

U.S. PATENT DOCUMENTS

| | | | |
|---|---|---|---|
| 2013/0007063 A1* | 1/2013 | Kalra | G06F 9/4493 707/796 |
| 2017/0017896 A1* | 1/2017 | Hamann | G06N 20/00 |
| 2019/0235846 A1* | 8/2019 | Janjua | G06F 8/34 |

* cited by examiner

MACHINE LEARNING FOR AUTOMATED MODEL GENERATION WITH CONSTRAINTS

CROSS-REFERENCE TO RELATED MATTER

This matter is related to and claims the benefit of provisional patent application, U.S. Application No. 62/533,432, filed Jul. 17, 2017, the entirety of which is incorporated here by reference.

BACKGROUND

Generating a model that can produce predictive results for a given data set is typically a manual, time-intensive task. Indeed, while a person may appreciate or know the desired, predicted results of elements of a data set, and could even reason out each predicted answer for each element of the set, producing a computer-implemented model, generated via machine learning, to generate accurate, predictive results for a given data set is challenging.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for generating executable models for modeling a data set according to a modeling intent are presented. A modeling service receives a data set from a submitting party as well as a set of constraints. A pipeline generator generates a set of pipelines according to a modeling intent of a data set and in view of the set of constraints. A machine learned trained judge conducts an analysis of the pipelines to identify an optimal model. The trained judge is a predictor which takes in information about a pipeline and corresponding featurized data set and predicts the efficacy of that pipeline in regard to the data set. Optimal results are generated according to the optimal model and the optimal results are provided to the submitting party in response to receiving the data set and constraints.

According to additional aspects of the disclosed subject matter, a method for generating an executable model for a data set in view of a set of constraints is provided. The method includes receiving a data set for modeling, and further receiving a set of constraints regarding the execution of a generated model. A set of pipelines for modeling the received data set is generated in consideration of the set of constraints. An optimal pipeline is identified from the pipelines. Optimal results are then generated according to the identified optimal model and the optimal results are provided to the submitting party.

According to further aspects of the disclosed subject matter, a computer system for generating one or more executable models to model a submitted data set is presented. The computer system includes at least a processor executing instructions retrieved from a memory. Additionally, the computer system includes a modeling service, a pipeline generator, and a trained judge. The modeling service, in execution on the computer system, receives a data set from a submitting party, and further receives a set of constraints in regard to the execution of a model in modeling the received data set. The pipeline generator, in execution on the computer system, generates a set of pipelines for modeling the received data set and according to the received set of constraints. The trained judge, in execution on the computer system, identifies an optimal pipeline for modeling the data set from the set of pipelines according to the received set of constraints. Moreover, the modeling service generates optimal results in view of the identified optimal model and returns the optimal results to the submitting party.

According to still further aspects of the disclosed subject matter, computer-implemented method for providing an executable model for generating one or models of a received data set is provided. The method includes providing a base of modeling metrics. The base of modeling metrics comprises a plurality of sets of modeling metrics from a plurality of models executed on a plurality of data sets, wherein each set of modeling metrics corresponds to a model executed on a data set. A corpus of modeling metrics is accessed and a set of candidate trained judge models for operating as a trained judge is generated. An optimal candidate trained judge model of the set of candidate trained judge models is identified by way of a currently executing trained judge model. Thereafter, the optimal trained judge model is executed in the stead of the currently executing trained judge.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
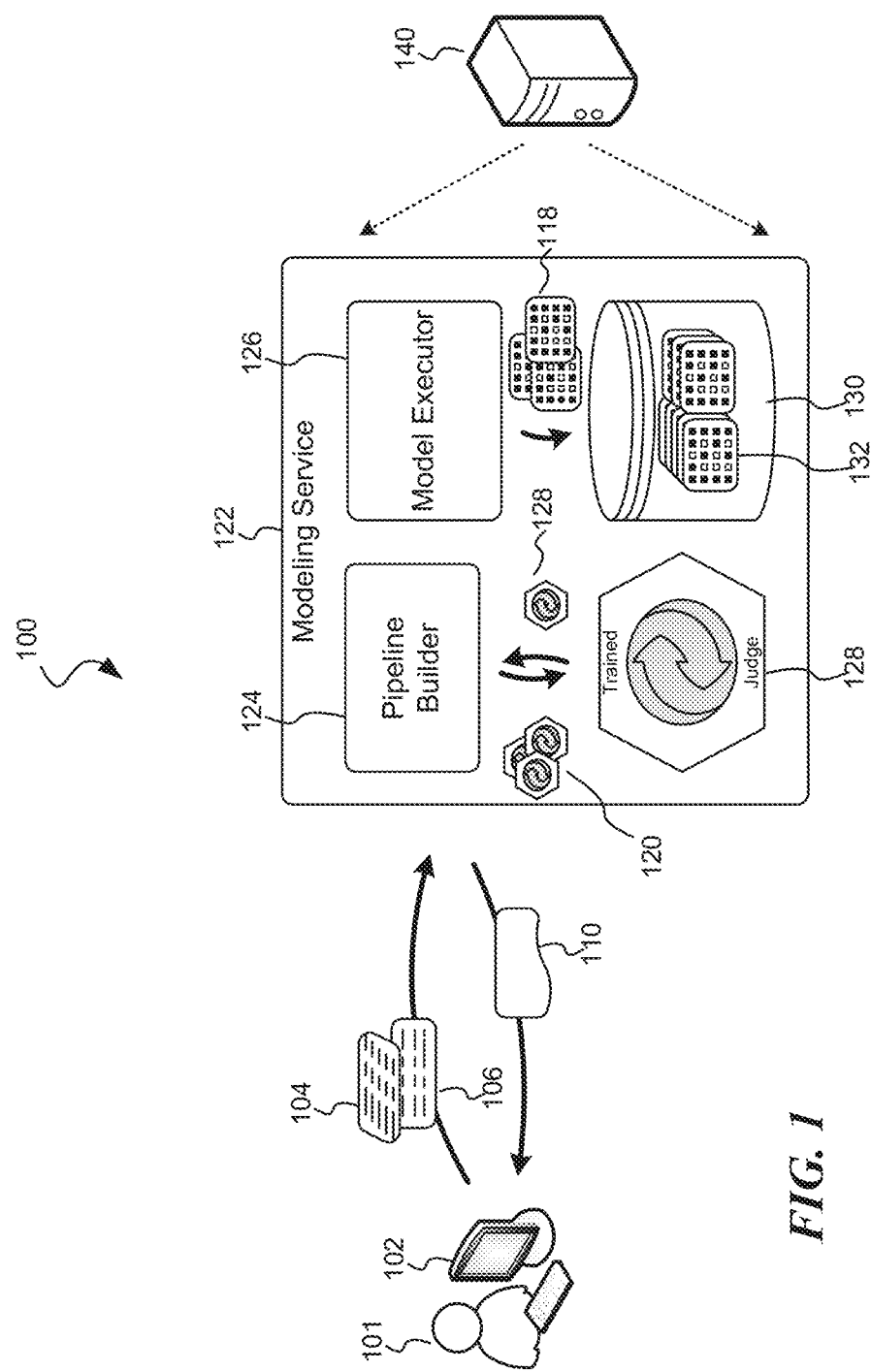
FIG. 1 is block diagram illustrating an exemplary network environment suitable for implementing aspects of the disclosed subject matter.

For purposes of clarity and definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

By way of additional clarity and definition, the term "data set" refers to set of one or more tuples or data elements. Each tuple or data element is an instance of data within a data set. A tuple may comprise one or more fields, where each field has a corresponding value (which may be a null value, especially in sparsely populated data elements and/or data sets). For purposes of the present description, a data set may be described in terms of a table, where each data element or tuple of the data set corresponds to a row within the table, and each field of the data elements corresponds to a column within the table. Of course, this is only one manner in which a data set may be visualized and, therefore, should be viewed as an embodiment, rather than as a limiting implementation of a data set.

By way of definition, a "model" is a trained pipeline. A model corresponds to an executable set of transforms, learners, selectors, categorizers, and the like that, in execution, processes data elements of a data set and, for each processed data element, produces a predicted response/result corresponding to an intent associated with the data set. In other words, a model is a trained predictor that, given a particular data set, generates predicted results based on a data set according to a desired intent. A "modeling intent" of the data set may be determined from analysis of the data set, or (more frequently) may be supplied by the party that submits the data set for modeling. The predicted response or results may be associated with a likelihood, reflecting an estimation that the result accurately reflects the modeling intent of the data set.

In contrast to a model, that is particularly directed to execution of a corresponding data set, a "pipeline" is a non-executable, higher level description of the processes needed to create a model for a corresponding data set. A pipeline includes processing tasks for the interpretation of a given data set, feature engineering (i.e., transforms which create feature vectors for a learner processing step), and result concatenation into a feature column. In contrast to a pipeline, a "recipe" is not customized for a dataset and includes or describes processing steps needed to apply itself to a specific data set. Indeed, a recipe may include or describe data transforms, learners, processing criteria (e.g., the data set must have multiple columns, must be multi-class classification tasks, etc.), and instructions on how to apply the transforms and learners to a feature column.

According to aspects of the disclosed subject matter, a data set modeling service for responding to a request for a computer-executable model for a given data set is provided. Upon receipt of a data set and related submitter information from a submitter, the data set is instrumented/featurized and, according to the instrumented data set and related information, a plurality of models is generated, where each model is directed to modeling the received data set according to a determined modeling intent. Featurizing a data set includes statistics of the data set such as (by way of illustration and not limitation): the number of rows (tuples) of the data set; the size (e.g., in bytes) of the data set; the number of numerical columns of each data element or tuple; statistical measures (e.g., the average, standard-deviation, skew, the kurtosis) of numbers in numerical columns, length of text columns, word count of text columns, etc.; cardinality of label columns; label skew; and the like.

Submitter information may include creation and/or execution constraints of the model, hyper-parameters corresponding to specific settings for use by learners, transforms, and other processing elements, a modeling intent of the data set, requested submitter information, and the like. Corresponding predicted modeling data may be generated for the plurality of generated pipelines. A trained judge then evaluates the various generated pipelines in view of the related submitter information and identifies optimal results for modeling the data set from the plurality of generated pipelines. As will be discussed in greater detail below, optimal results may include identifying an optimal pipeline of the plurality of generated pipeline for processing the data set. Thereafter, model result (corresponding to and based on the intent/request of the submitter as determined from the related submitter information) is provided to the submitter.

Advantageously, while multiple pipelines are generated, each of which may be used to process a data set according to related submitter information, the trained judge is suitably trained and implemented to evaluate among the various generated models for a given data set and identify optimal results. According to aspects of the disclosed subject matter, optimal results are typically determined according to the modeling intent and requested submitter information in view of any constraints and/or hyper-parameters that the submitter has supplied, or that can be accurately inferred from the context of the data set submission. In identifying optimal results, the data set modeling service is able to quickly and efficiently eliminate typical experimentation and evaluation of multiple models that may be used, instead directly providing the submitter information. Moreover, in determining optimal results, the data set modeling service may provide valuable modeling information to the submitter (as may be the request of the submission) regarding the execution of the submitted data set. This modeling information may include predicted execution costs, time, required resources, expected accuracy and the like for modeling the data set according to the related submitter information.

Turning now to FIG. 1, FIG. 1 is a block diagram an exemplary environment 100 suitable for implementing aspects of the disclosed subject matter, particularly in regard to a data set modeling service that provides modeling information to a party in response to that party submitting a data set to the service. The environment 100 includes a submitting party 101 that submits, by way of a computing device 102, a data set 104 to a data set modeling service 122. In one embodiment, not shown, the data set modeling service 122 may be implemented on the submitting party's computing device 102, or by way of a direct connection to the data modeling service 122. Alternatively, the data set modeling service 122 may be operating on another computing device 140 other than the submitting party's device. Further still, while not shown in FIG. 1, according to various embodiments of the disclosed subject matter, the submitting party 101 may submit the data set 104 to the data set modeling service 122 over a network. A suitable network may include, by way of illustration and not limitation, a local-area network or LAN, a wide-area network or WAN. The Internet, a global system of interconnected computer networks that use the Internet protocol suite to link to other devices, is one example of a suitable network.

In addition to submitting a data set 104 to the data set modeling service 122, the submitting party typically, but not exclusively, submits related submitter information 106. This related submitter information 106 may include (by way of illustration and not limitation) one or more creation constraints regarding the creation of a model for modeling the data set and/or one or more execution constraints regarding the execution (or interpretation) of a model in modeling (producing the desired results) of the submitted data set. In addition to, or as an alternative to, the constraints, the related submitter information 106 may also include one or more features and/or hyper-parameters regarding the data set. As indicated above, a hyper-parameter corresponds to a specific setting used by learners and transforms in creating a model. By way of example and not limitation, a hyper-parameter may specify that bi-grams (double word pairs) be used instead of unigrams for featurizing text content, or the number of trees in a boosted decision tree should be used in a learner. Still further, the related submitter information 106 may also or alternatively include processing suggestion and or recipes for modeling the data set 104. Processing suggestions may include descriptions as to how an entire data element may be processed, or how various fields (columns) within a given data element may be processed. Processing suggestions may further include a modeling intent, i.e., the desired modeling result of the submitter with regard to the data set.

Upon receiving the submitted data set 104, the data set modeling service 122 featurizes the data set in view of the related submitter information 106 for analysis. By way of illustration and not limitation, featurizing the data elements of the data set serves to place the data set in a suitable condition for analysis and processing and may include any of identifying important columns within the data set upon which decisions regarding modeling may be based, applying hyper-parameters to the instrumented data elements, isolating and/or deleting columns within the data set that are unimportant to modeling the data set according to a determined (user supplied or inferred) modeling intent, expanding multi-field columns, classifying columns and types, identifying labels within the data set, and the like. Once instrumented, a pipeline builder 124 analyzes the data in view of the various constraints provided by the submitting party and in further view of a body of modeling metrics 130 comprising modeling metrics resulting from the execution of a large body of models on a large body of data sets to generate a set of pipelines 120 suitable processing the submitted data set according to modeling intent of the data set. Modeling metrics, as may be stored in the corpus of modeling metrics, are statistical measures of the performance of a model with regard to a data set. Modeling metrics can be computed in real-time during the execution of a model. The goal of modeling metrics is to inform how well the model is matching the modeling intent of the submitting party. A trained judge can predict the modeling metrics of a candidate model for a given pipeline/data set, or simply order a set of pipelines according to predicted results. Examples of the various modeling metrics may include training time, prediction QPS (quality of service prediction), memory used during training, final model size, and the like.

The analysis by the pipeline generator may include, by way of illustration and not limitation, determining similarities between data element fields of the data set 104 in view of the body of modeling metrics 130 of previously modeled data sets, determining field types within the various data elements of the data set, reasoning how these field types corresponds to field types of other data sets that have already been run (as recorded in the body of modeling metrics 130), as well as recipes and processing suggestions supplied by the submitting party 101.

Regarding the body of modeling metrics 130, each set of modeling metrics, such as modeling metrics 132, includes information regarding the nature of the model that was executed, the type of data fields, the number of data fields of the data set, success of the executing model with regard to the modeling intent of the data set, performance metrics in executing the model on the data set, and the like. Those previously modeled data sets may also be stored in the body of modeling metrics 130 for future reference, comparison and evaluation. According to one embodiment of the disclosed subject matter, the body of modeling metrics 130 includes information regarding millions of modeling runs of a plurality of models with regard to a plurality of data sets.

As indicated above, based on the analysis of the submitted data set and related information, and in view of the constraints, hyper-parameters and/or modeling intent set forth by the submitting party 101, and in further view of the various modeling metrics in body of modeling metrics 130, a set of pipelines 120 are produced to satisfy the modeling intent of the submitted data. These pipelines 120 are provided to a trained judge 128 for further evaluation. According to aspects of the disclosed subject matter, the trained judge 128 is, itself, a model that, in execution, is trained and configured to evaluate between the set of pipelines 120 in view of the constraints and modeling intent to identify optimal results, and in further view of the body of modeling metrics 130. According to aspects of the disclosed subject matter, optimal results may comprise the selection of a model from among the pipelines that, in view of the constraints and intent, provides the best or optimal results. In this regard, "best or optimal" may be based on a number of factors including, by way of illustration and not limitation, modeling costs, execution time of modeling, specific resources needed to model, accuracy of the model, and the like. Alternatively, optimal results may comprise ordering the set of pipelines 120 according to various criteria (including costs, execution time, accuracy, predicted results, and the like.) Still further, determining optimal results may comprise execution of a model (a selected optimal model from the pipelines) to generate resulting modeling information and/or modeling metrics. Yet another optimal result may include selecting an optimal model 128 from the pipelines 120 and providing predicted results regarding the execution of the selected optimal model.

In addition to generating or providing optimal results, the data set may be executed by a model executor 126 in order to capture one or more sets of modeling metrics 118. Executing the optimal model (or all of the generated pipelines) against the data set in view of the various constraints, hyper-parameters and/or intents and capturing the modeling metrics (and data set) is useful information for use by the trained judge in evaluating the candidate data sets, and is further useful in generating a trained judge, or an updated trained judge, that can determine the optimal results.

The optimal results 110, are then provided to the submitting party in response to the submission of the data set 104 and related submitter information 106. As suggested above, the optimal results 110 may include (by way of illustration and not limitation) the optimal model 128 or a reference to an online service that has been configured to execute the optimal model, predicted results of the optimal model, modeling metrics regarding execution of the optimal model, and the like.

Figure 2:
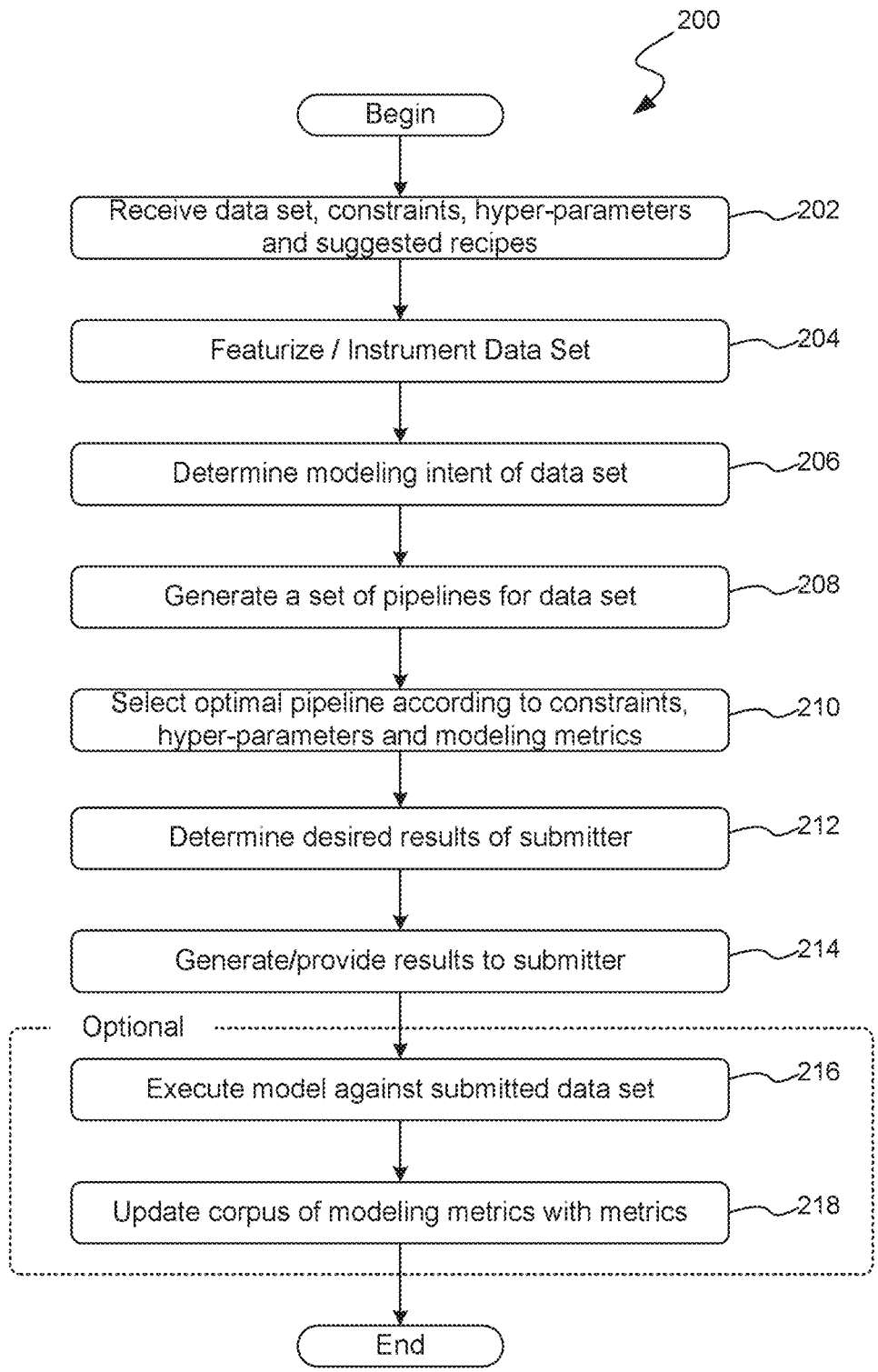
FIG. 2 is a flow diagram illustrating an exemplary routine for responding to a submitted data set in view of user-supplied related submitter information.

Turning now to FIG. 2, FIG. 2 is a flow diagram illustrating an exemplary routine 200 for responding to a submitted data set in view of user-supplied related submitter information. Beginning at block 202, a data set 104 and optional related submitter information 106 are received from a submitting party 101. The optional related submitter information 106 may include but is not limited to execution and/or model generation constraints, hyper-parameters, a modeling intent, suggested processing techniques and/or recipes for modeling the data set, desired optimal results, and the like.

As indicated above, a constraint corresponds to an indication by the submitting party 101 of some condition or limitation with regard to the execution or creation of a resulting model. Indeed, a constraint may correspond to how the model is created for execution as well as how the model performs in execution. A constraint may identify a target execution platform or environment in which the submitting party intends that the executable model will be run. A constraint may identify executable size restrictions and/or requirements on the executable model. A constraint may identify a cost that the submitting party (of the data set) is willing to pay for modeling the data set. A constraint may identify performance metrics such as bandwidth requirements or limitations. A constraint may identify a desired accuracy of the generated model—which may have a cascading effect on performance, costs and target execution environments. Still further, a constraint may identify a speed (as in how quickly a previously unseen data set is modeled) or whether the modeling may be conducted offline. By way of illustration, the submitting party may anticipate that an executable model with be run by a cloud service, such as Microsoft's Azure services. Alternatively, the submitting party may indicate that the resulting executable model will be implemented on a local desktop computer, or on a mobile device. In each case, processing ability, bandwidth, costs associated with executing the model, and the like may be affected according to any constraints identified by the submitting party. Still further, the submitting party may be willing to have the model executed off-line, in anticipation that it takes more time but produces highly accurate results, or that off-line costs are less than on-demand processing.

As indicated above, a hyper-parameter is a condition or setting for use by transformers, learners, selectors, etc., in processing the data set. A pipeline may specify one or more hyper-parameter values, though some learner- and/or transform-specific hyper-parameters may be left to defaults or automatically inferred within the learner and/or transform, or even auto-adjusted during a training process. Additionally, a recipe may define some or all of the hyper-parameters used in a corresponding pipeline. By way of illustration and not limitation, a hyper-parameter may specify the use of bi-grams in regard to featurizing textual content, rather than a default uni-gram.

After receiving the data set 102 and optional related submitter information from the submitting party 101, at block 204 the data set is featurized or instrumented. Featurizing or instrumenting a data set may include determining the type of file (i.e., the data set) that has been submitted, nature of data for each column (data element field) of a data element (e.g., Boolean, numeric, multi-state, text data, etc.), determining average, mean, kurtosis, minimum and maximum values of columns, identifying label columns, cardinality of columns, and the like. In various embodiments, instrumenting or featuring (used synonymously herein) may result in the data elements being converted to a vectorized format, i.e., each data element being converted into a vector. In short, featuring the data set comprises engineering the raw data of the data set into a usable format for further processing.

At block 206, the intent of the data set is determined according to an analysis of the data set, as well as any information that may be provided by the submitting party particularly in regard to the related submitter information 106. Without additional guidance by the submitting party, determination of the intent is made according to an analysis of the data set itself in light of and/or consideration of the various intents of other data sets as evidenced by the corpus of modeling metrics 130 maintained by the data set modeling service 122. The modeling intent may be inferred by similarity to other data sets, the type of data within the various data elements, and the like.

After determining the intent, at block 208 one or more models are generated for the submitted data set in view of an analysis of the data set, modeling metrics in the corpus of modeling metrics 130, and further based in view of any constraints, hyper-parameters, suggested recipes and/or processing suggestions of the submitting party 101. Generally speaking, the corpus of modeling metrics 130 (which contains modeling metrics resulting from a plurality of models executing on a plurality of data sets, where each execution of a model with regard to a data set results in a set of modeling metrics) is accessed and an analysis of the received data set is conducted to determine an intent (if not already supplied by the submitting party), and also to determine which pipeline steps of previous models (as evidenced in the many sets of modeling metrics) are likely to provide the desired intent, and further likely to provide the desired intent according to the constraints and hyper-parameters submitted by the submitting party. According to aspects of the disclosed subject matter, models are generated that are predicted to produce desirable results (as determined by costs, performance, speed, bandwidth, and the like) in execution and according to the constraints and hyper-parameters provided with the data set. Generally speaking, the desirable results are those that have "interesting" performance metrics such as high accuracy, low costs, quick processing, low processing usage, and the like.

Generating a set of one or more pipelines 120 may comprise comparing and contrasting the received data set against the modeling metrics in the corpus of modeling metrics 130. This may include, by way of illustration and not limitation, identifying similar data structures of the submitted data set against modeling metrics having similar data sets, determining which modeling elements (e.g., transforms, selections, learners and/or processing operations, inferences) have performed well on similar data sets and in view of similar constraints and/or hyper-parameters, inferring and extrapolating metrics and predicted performance data according the modeling metrics and performance data of target execution environments, determining the impact of constraints (such as the target device upon which an executable model will be executed, or the cost targets of the submitting party for executing the model, and the like) will have on a given model, and the like. Techniques and algorithms (corresponding to the various transforms, learners, selectors, inferences) may include, by way of illustration and not limitation, techniques and analyses such as k-means clustering, principle component analysis (PCA), DSSM (deep semantic similarity modeling), multivariate Gaussian distribution techniques, comparative distance functions, density-based clustering, SSWE techniques, n-gram comparisons and distance calculations, and the like. Indeed, in one embodiment of the disclosed subject matter, there are hundreds of learners, transformations, featurization and other processes that may be utilized in developing a model.

In short, generating a set of one or more pipelines for the submitted data set is based on an analysis of similarities between the submitted data set and those that have been run (as recorded in the modeling metrics), and from inferences and extrapolations from the modeling metrics in the corpus of modeling metrics 130 and performance metrics of target execution environments. Generating the one or more models further comprises generating predicted performance metrics for each of the generated models. These predicted metrics include anticipated execution costs (of executing or interpreting the model), anticipated size of an executable model, execution time, accuracy estimations, and the like. Based on the various comparisons, inferences, and other operations to identify suitable models, one or more processing elements or techniques are identified that, collectively and in execution, are suitably calculated to model the submitted data set according to the modeling intent in view of constraints and hyper-parameters.

In regard to constraints and hyper-parameters, while a model for the submitted data set may be generated that provides a high degree of accuracy, the model may not be usable in light of a given constraint or hyper-parameter. For example, while a model may be generated that would yield desired results with a high degree of accuracy, the cost of executing such model may be beyond the desired costs of the submitting party. Alternatively, a highly effective model may not be able to provide a desired timeliness of the submitting party.

While many models may be generated for a given data set and corresponding constraints, generating the one or more pipelines may further comprise selecting a small number of models that, based on the analysis, are determined to be the best set of models based on the predicted performance results (whether the predicted performance results are based on speed of model, the bandwidth that is used, accuracy of the model, the cost of modeling the data, or some other performance measure.) Thus, at block 210, a resulting model is selected among the pipelines as the resulting model for the submitted data set. Selection is based according to the predicted metrics of the pipelines, as well as the constraints supplied by submitting party.

At block 212, a determination as to the desired results of the submitting party is made. Indeed, the desired results may be that the submitting party is provided the resulting model 128. Alternatively, the desired results may be in regard to the predicted metrics of the resulting model, or in the results of executing of the model on the data set. Still further, the desired results may correspond to a plurality of models for modeling the submitted data set, potentially ordered according to predicted efficacy. A desired result may be a link or reference to an online service established to execute the resulting model on the submitted data set. Accordingly, the determination is made as to the nature of the desired results. Correspondingly, at block 214, the desired results 110 are generated and provided to the submitting party.

At block 216, if execution of the resulting model with regard to the data set has not already occurred (as part of the desired results), the resulting model is optionally executed against the data set. At block 218, modeling metrics regarding the execution of the resulting model against the data set are stored in the corpus of modeling metrics 130. Thereafter, routine 200 terminates.

While not show or recited in routine 200, pipelines 120 may also be executed against the submitted data set and their modeling metrics recorded. This, of course, provides more information that may be used by the trained judge 128 to determine/identify the optimal results for the combination of the given data set in view of the constraints, hyper-parameters, and modeling intent.

According to aspects of the disclosed subject matter and as suggested above, while the trained judge 128 may be encoded to analyze a submitted data set in view of modeling metrics of the corpus of modeling metrics 130, advantageously the trained judge may be implemented as an executable model itself. Indeed, on a periodic basis (or on some triggered threshold of data) the trained judge 128, using the modeling metrics of the corpus of modeling metrics 130, may generate one or more trained judge models for modeling data sets, utilizing much of the process described in regard to routine 200. The generated pipelines, based on their predicted metrics, may be analyzed against the predicted or actual metrics of the current trained judge 128 to determine whether the currently executing trained judge should be updated according to a new, optimal model. The process for generating a new trained judge is set forth in regard to FIG. 3.

Figure 3:
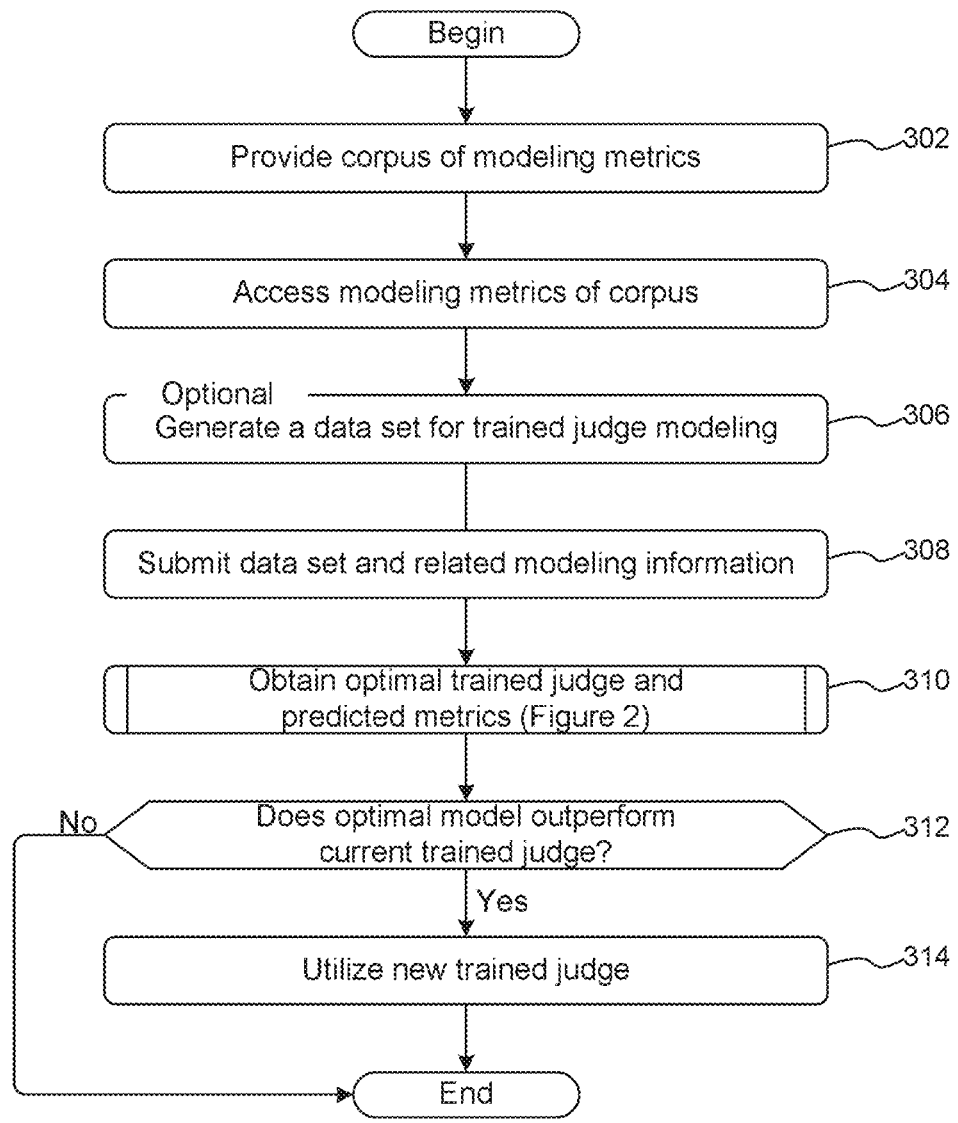
FIG. 3 is a flow diagram illustrating an exemplary routine for potentially updating the current trained judge model.

FIG. 3 is a flow diagram illustrating an exemplary routine 300 for potentially updating the currently executing trained judge. Beginning at block 302, a corpus of modeling metrics 130 is provided for analysis. At block 304, access to the modeling metrics is made.

At block 306, a data set for trained judge modeling is optionally generated. According to one embodiment the optional data set may include a plurality of data sets that are stored in or with the corpus of modeling metrics 130, where each of those data sets corresponds to a data element of the generated data set.

At block 308, the generated data set is provided to the functionality of routine 200 and, in return, is provided with an optimal model for modeling data sets with corresponding predicted metrics. Constraints may be set to indicate a target execution environment, time constraints, accuracy constraints, and the like. A modeling intent may also be provided as well as hyper-parameters that may be applicable.

At block 310, an optimal trained judge model and corresponding predicted metrics is provided in response to the submission of the data set and related submitter information. At block 312, a determination is made as to whether, based on actual performance and predicted performance of the current trained judge vs. the predicted performance of the optimal trained judge, the newly generated optimal trained judge will outperform the current trained judge. If the determination suggests that the newly provided optimal trained judge will not outperform the current trained judge, the routine 300 terminates. Alternative, if the newly generated optimal model is predicted to (or determined to) outperform the current trained judge, at block 314 the newly generated optimal model is used as the new trained judge, replacing the previous trained judge. Thereafter, the routine 300 terminates.

Regarding routines 200 and 300 described above, as well as other processes that may be described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processes include various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 4 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
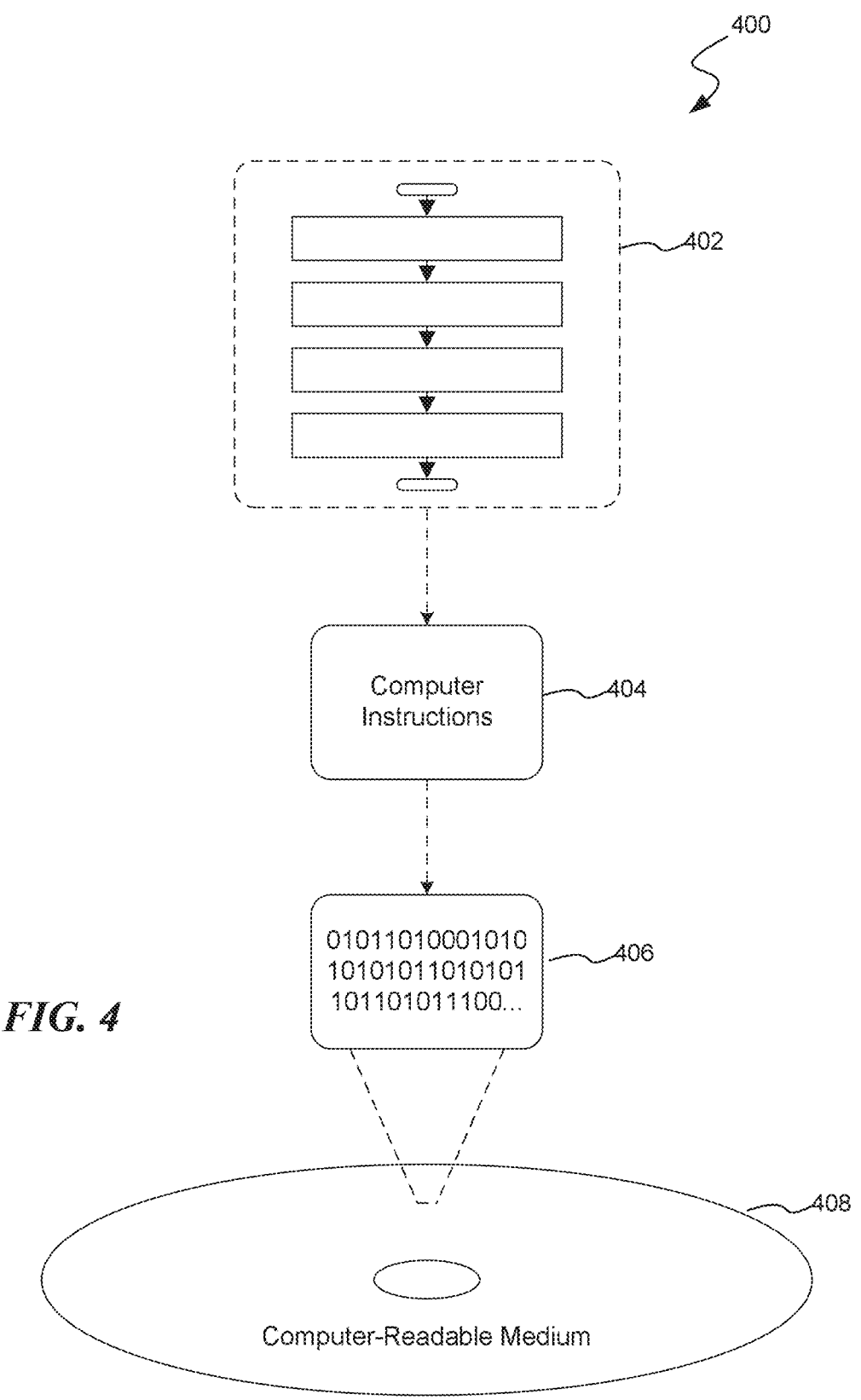
FIG. 4 is a block diagram illustrating an exemplary computer readable medium encoded with instructions, including instructions for generating one or more executable models for a received data set according to user-supplied constraints, and/or processing suggestions or recipes for generating an executable model for identifying one or more executable modules for a received data set.

Regarding computer readable media, FIG. 4 is a block diagram 400 illustrating an exemplary computer readable medium 408 encoded with computer-executable instructions 404, including instructions for generating one or more executable models for a received data set according to user-supplied constraints, and/or processing instructions or recipes for generating an executable model for identifying an optimal module (or other desired results) for a received data set. More particularly, the implementation 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of exemplary method 200 or 300, as set forth above. In another such embodiment, the processor-executable instructions 404 may be configured to implement a system on a computing device, such as at least some of the exemplary, executable components of system 500, as described below. Many such computer readable media may be devised, by those of ordinary skill in the art, which are configured to operate in accordance with the techniques presented herein.

Figure 5:
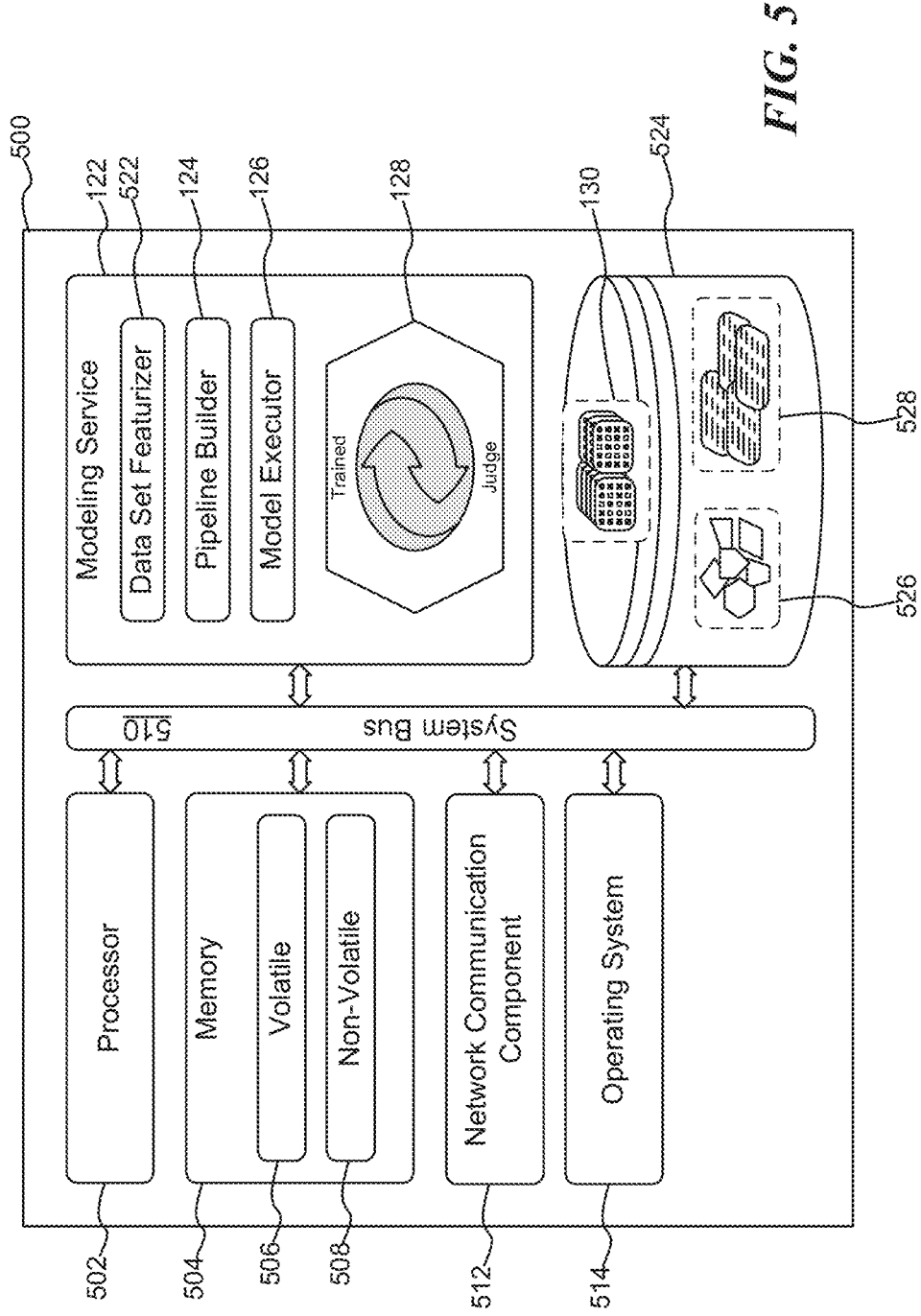
FIG. 5 is a block diagram illustrating an exemplary computing system suitably configured for implementing aspects of the disclosed subject matter.

Turning to FIG. 5, FIG. 5 is a block diagram illustrating an exemplary computing system 500 suitably configured for implementing aspects of the disclosed subject matter, particularly in regard to generating one or more models for a given data set.

The computing system 500 includes one or more processors (or processing units), such as processor 502, and further includes at least one memory 504. The processor 502 and memory 504, as well as other components, are interconnected by way of a system bus 510. As will be appreciated by those skilled in the art, the memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

As will also appreciated by those skilled in the art, the processor 502 executes instructions retrieved from the memory 504, from computer readable media, such as computer readable media 400 of FIG. 4, and or other executable components in carrying out various functions of inferring relationship information of a target person from captured communication content. The processor 502 may be comprised of any of a number of available processors such as single-processor, multi-processor, single-core units, and multi-core units, which are well known in the art.

Further still, the illustrated computing system 500 may also include a network communication component 512 for interconnecting this computing device with other devices and/or services over a computer network, such as Internet mentioned above. The network communication component 512, sometimes referred to as a network interface card or NIC, communicates over a network using one or more communication protocols via a physical/tangible (e.g., wired, optical fiber, etc.) connection, a wireless connection such as WiFi, near-field communication (NFC) or Bluetooth communication protocols, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

In addition to the various component identified above, the computing system 500 further includes an operating system 514 that provide system software for the computing device, which manages both hardware and software resources of the computer. As will be appreciated by those skilled in the art, the operating system also provides a common set of services for the execution of executable modules, including applications, services, drivers, daemons, processes, and the like, on the computing system 500.

Additionally, included in the computing system 500 is a modeling service 122. In execution, the modeling service 122 provides various modeling services as describe above, particularly in regard to FIGS. 1, 2 and 3. Indeed, the modeling service 122, in execution on the computing system 500, receives a submitted data set and carries out the functionality described above in regard to generating pipelines with predicted performance data for the submitted data set in view of constraints, hyper-parameters and other processing suggestions, identifying or generating optimal results including identifying an optimal model from the pipelines, and providing the optimal results to the submitting party.

The modeling service 122 utilizes various logical and executable components to carry out the various tasks of generating models for data sets. These include a data set featurizer 522. As suggested above in regard to FIG. 2, the data set featurizer 522 processes the data elements of the data set to place the data set in a suitable condition for analysis and processing. This processing may include identifying important columns within the data set upon which decisions regarding modeling may be based, isolating and/or deleting columns within the data set that are unimportant to modeling the data set, expanding multi-field columns, classifying columns and types, identifying labels within the data set, and the like.

A pipeline builder 124, in execution, analyzes the data in view of the various constraints provided by the submitting party and in further view of a body of modeling metrics 130 comprising modeling metrics resulting from the execution of a large body of models on a large body of data sets to generate a set of pipelines 120 suitable processing the submitted data set according to modeling intent of the data set.

A model executor 126, in execution, carries out the execution of a model against a data set and further generates a set of modeling metrics, such as modeling metrics 132, for the executed model/data set and stores this information in the corpus of modeling metrics 130.

The trained judge 128, is an executable model that, in execution on the computing system 500, operates to judge between pipelines generated by the pipeline builder 124 to identify optimal results in view of constraints, hyper-parameters, and the modeling intent of the submitting party. Moreover, one of the roles of the trained judge 128 is to determine whether it should replace itself with a newly generated trained judge, as discussed in regard to FIG. 3.

As further shown, a data store 524 includes the corpus of modeling metrics 130 described above, as well as corresponding data sets 528 and processing elements and/or recipes 526.

Regarding the various components of the illustrated computing system 500, those skilled in the art will appreciate that many of these components may be implemented as executable software modules stored in the memory of the computing device, as executable hardware modules and/or components (including SoCs—systems on a chip), or a combination thereof. Indeed, components may be implemented according to various executable embodiments including executable software modules that carry out one or more logical elements of the processes described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. An automated method for training a machine learning system in view of a set of constraints, the method comprising:
   receiving a data set for modeling from a submitting party;
   generating a set of candidate pipelines for modeling the received data set based on, at least in part, an analysis of similarities between the received data set and previously modeled data sets;
   identifying, by a currently executing trained judge model, an optimal pipeline of the candidate pipelines;
   generating optimal results according to the identified optimal pipeline, wherein the currently executing trained judge model is updated according to an optimal trained judge model identified from a set of candidate trained judge models; and
   providing the optimal results to the submitting party in response to the received data set.

2. The computer-implemented method of claim 1, further comprising identifying a modeling intent of the received data set.

3. The computer-implemented method of claim 2, further comprising:
   receiving a set of constraints regarding the creation or execution of a generated model for the received data set from the submitting party; and
   wherein the set of candidate pipelines for modeling the received data set are generated in consideration of the set of constraints.

4. The computer-implemented method of claim 3, wherein generating a set of candidate pipelines for modeling the received data set in consideration of the set of constraints comprises:
   accessing sets of modeling metrics within a corpus of modeling metrics, wherein each set of modeling metrics within the corpus corresponds to the execution of a model in regard to a data set;
   analyzing the received data set in view of the accessed sets of modeling metrics and in further view of the modeling intent and the set of constraints;
   determining one or more sets of pipeline steps, where each set of pipeline steps collectively satisfy the identified intent; and
   generating a pipeline from each of the one or more sets of pipeline steps.

5. The computer-implemented method of claim 4, further comprising:
   determining predicted performance metrics for each candidate pipeline of the set of candidate pipelines; and associating the predicted performance metrics with each pipeline of the set of pipelines.

6. The computer-implemented method of claim 5, further comprising:
receiving one or more recipes regarding processing of the data set;
wherein generating the set of pipelines in consideration of the set of constraints comprises generating the set of pipelines in consideration of the set of constraints and in consideration of the one or more recipes.

7. The computer-implemented method of claim 6, further comprising:
receiving one or more hyper-parameters corresponding to data elements of the received data set;
wherein generating the set of pipelines in consideration of the set of constraints comprises generating the set of pipelines in consideration of the set of constraints and recipes, and in further consideration of the one or more hyper-parameters.

8. The computer-implemented method of claim 5, further comprising:
receiving one or more hyper-parameters corresponding to data elements of the received data set;
wherein generating the set of pipelines in consideration of the set of constraints comprises generating the set of pipelines in consideration of the set of constraints and in consideration of the one or more hyper-parameters.

9. The computer-implemented method of claims 8, wherein the one or more constraints comprise any one of an accuracy constraint, a cost constraint, a target execution environment constraint, a performance constraint, a model creation constraint, and a bandwidth constraint.

10. The computer-implemented method of claim 5, further comprising featurizing the received data set for analysis of the data set, wherein featurizing the received data set comprises generating a feature vector from one or more of the data elements of the received data set.

11. A computer system for generating one or more executable models to model a submitted data set, the computer system comprising at least a processor executing instructions retrieved from a memory in conjunction with additional executable components, the additional executable components comprising:
a modeling service that, in execution on the computer system, receives a data set from a submitting party;
a pipeline generator that, in execution on the computer system, generates a set of pipelines for modeling the received data set based on, at least in part, an analysis of similarities between the received data set and previously modeled data sets; and
a currently executing trained judge model that, in execution on the computer system, identifies one or more optimal pipelines for modeling the data set from the set of pipelines, wherein the currently executing trained judge model is updated according to an optimal trained judge model identified from a set of candidate trained judge models, and wherein the modeling service generates optimal results in view of the identified one or more optimal pipelines and returns the optimal results to the submitting party.

12. The computer system of claim 11, wherein:
the modeling service further receives a set of constraints in regard to the execution of the pipeline in modeling the received data set;
the pipeline generator generates the set of pipelines for modeling the received data set in view of the received set of constraints; and
the currently executing trained judge model identifies the one or more optimal pipelines for modeling the data set from the set of pipelines in view of the received set of constraints.

13. The computer system of claim 12, wherein generating a set of pipelines for modeling the received data set in view of the received set of constraints comprises:
accessing sets of modeling metrics within a base of modeling metrics, wherein each set of modeling metrics corresponds to the execution of a model in regard to a data set;
analyzing the received data set in view of the sets of modeling metrics within the base of modeling metrics and in further view of a modeling intent and the set of constraints;
determining one or more sets of pipeline steps, where each set of pipeline steps collectively satisfy the modeling intent; and
generating a pipeline from each of the one or more sets of pipeline steps.

14. The computer system of claim 13, wherein the pipeline generator is further configured to:
determine predicted performance metrics for each pipeline; and
associate the predicted performance metrics with each pipeline.

15. The computer system of claim 12, wherein:
the modeling service receives a hyper-parameter regarding data elements of the data set from the submitting party; and
the pipeline generator generates the set of pipelines according to the set of constraints and according to the received hyper-parameter.

16. The computer system of claim 15, wherein the currently executing trained judge model is an executable model configured to execute on the computer system.

17. The computer system of claim 16, wherein the received set of constraints comprises any one or more of an accuracy constraint, a cost constraint, a target execution environment constraint, a performance constraint, and a bandwidth constraint.

18. The computer system of claim 15, further comprising a data set featurizer that, in execution on the computer system, featurizes one or more data elements of the data set, wherein featurizing a data element comprises generating a feature vector from that data element.

19. The computer system of claim 15, further comprising an executable model executor and an executable metrics analyzer;
wherein the model executor, in execution on the computer system, is configured to execute a model in regard to a data set; and
wherein the metrics analyzer, in execution on the computer system, is configured to capture modeling metrics of an executed model on a data set and store the modeling metrics as a set of modeling metrics in the base of modeling metrics.

20. A computer-implemented method for providing an executable model for generating one or models of a received data set, the method comprising:
providing a base of modeling metrics, the base comprising a plurality of sets of modeling metrics from a plurality of models executed on a plurality of data sets, wherein each set of modeling metrics corresponds to a model executed on a data set;
accessing the modeling metrics of the base of modeling metrics;

generating a set of candidate trained judge models for operating as a trained judge;
identifying an optimal trained judge model of the set of candidate trained judge models by way of a currently executing trained judge model; and
executing the optimal trained judge model in the stead of the currently executing trained judge model.

* * * * *